Sept. 11, 1923.  E. O. BENNETT  1,467,773

PUMPING POWER FOR WELLS

Filed Sept. 29, 1921

Inventor
EDWIN O. BENNETT
Lyon & Lyon
Attorneys

Patented Sept. 11, 1923.

1,467,773

UNITED STATES PATENT OFFICE.

EDWIN O. BENNETT, OF BAKERSFIELD, CALIFORNIA.

PUMPING POWER FOR WELLS.

Application filed September 29, 1921. Serial No. 504,244.

*To all whom it may concern:*

Be it known that I, EDWIN O. BENNETT, a citizen of the United States, residing at Bakersfield, in the county of Kern and State of California, have invented new and useful Improvements in Pumping Power for Wells, of which the following is a specification.

This invention relates to an apparatus for transmitting motion from a prime mover to the pumping jacks for a series of wells, and an object of the invention is to simplify the pumping power.

The invention will be more readily understood, if the following facts be considered;

Deep well pumps, such as those employed, for example, in the oil well industry, are operated comparatively slowly, and the prime movers for furnishing power to the pumps run at a comparatively high rate of speed, thus necessitating a very considerable reduction in speed, between the prime mover and the pumps. At present the reduction is effected by either a relatively large gear in mesh with a relatively small pinion, or by a somewhat complicated system of levers.

By the use of this invention, there is provided a comparatively simple combination of elements, which effects a very great reduction in speed between the prime mover and the cable operating devices that are similar in construction to those at present in use. I effect the reduction in speed by differential gearing.

The accompanying drawings illustrate the invention.

Figure 1:
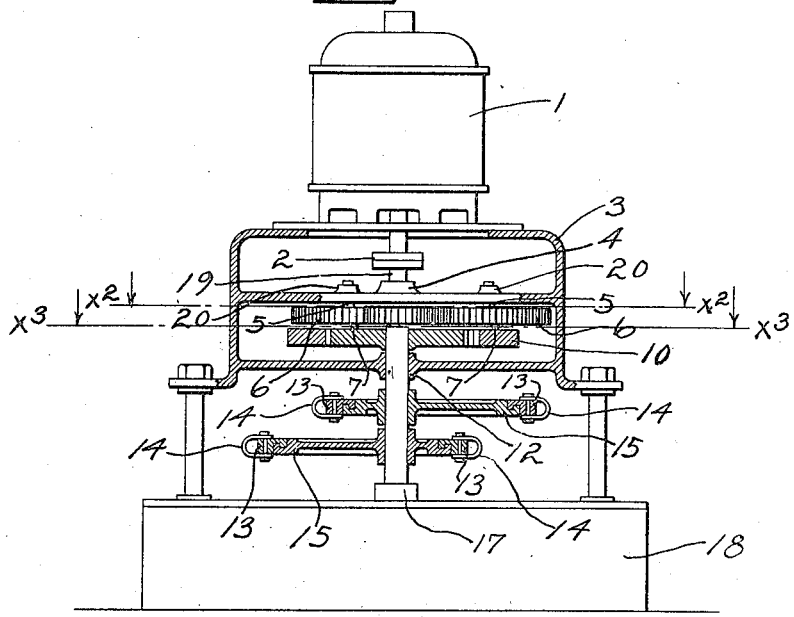
Figure 1 is a side elevation, partly in section, of an apparatus constructed in accordance with the provisions of this invention.
Figure 2:
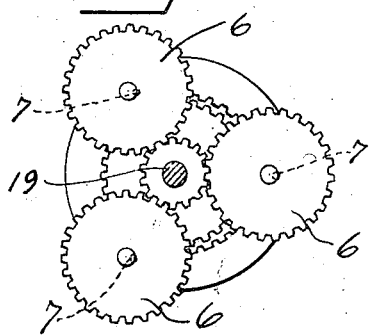
Figure 2 is a plan view of the gearing on line indicated by $x^2$—$x^2$, Figure 1.
Figure 3:
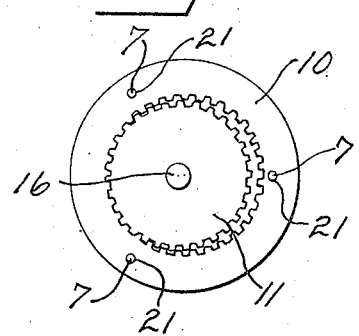
Figure 3 is a plan view of the gearing on line indicated by $x^3$—$x^3$, Figure 1.

The prime mover for furnishing the power is indicated at 1 and may be of any desired type. The prime mover indicated is an electric motor and its shaft is connected by a coupling 2 to a high speed pinion shaft 19. The motor 1 is supported on a frame 3, which also supports bearings 20 for stub shafts 5 upon which are mounted spur gears 6. In the instance shown in the drawings, the axes of the gears 6 are spaced one hundred and twenty degrees of circular measurement, and said gears are in mesh with a spur pinion 9 on the shaft 19.

Each of the gears 6 is provided with a downwardly projecting crank pin 7, and the pins respectively engage suitable bearings 21 formed in an internal spur gear 10.

Inside of the internal gear 10 is a spur gear 11 of slightly less diameter, the teeth of the gear 11 with the exception of two or three, meshing with the teeth of the internal gear. In the drawings the exact construction of the gears 10 and 11 cannot be shown, because of the great reduction in the scale of the drawings, but in practice the gear 10 will preferably have two teeth more than the gear 11.

The gear 11 is mounted on the upper end of a slow speed shaft 16 journaled at its lower end in a bearing 17 which is supported by a base 18. To the base 18 is secured, by standards 8, the frame 3. The frame 3 carries a bearing 12 in which the upper portion of the shaft 16 is journaled. The frame 3 may be in the form of a casing enclosing the gears 6, 9, 10 and 11.

The cables, not shown, which operate the pumping jacks, not shown, adjacent the wells being pumped, are connected by shackles 14, to eccentric straps 13 on eccentrics 15. Any other suitable cable operating means than the eccentrics may be employed, if desired. The approximate speed of the motor 1 will be 600 revolutions per minute and the pumps are usually operated at a speed of about 14 strokes per minute. These speeds will vary somewhat in practice and are only stated to give an idea of the great difference in speed between the pumps and the prime mover.

The invention operates as follows: Operation of the motor 1 turns the pinion 9 which effects rotation of the gears 6. In the drawings three gears 6 are shown, but it is to be understood that the invention is not limited to the use of three and that any other suitable number may be employed. The gears 6 are of considerably larger diameter than the pinion 9, thus effecting a reduction in speed from the pinion to the gears. Rotation of the gears 6 causes rotation of the pins 7 about the axes of said gears, thus inducing eccentric motion of the gear 10 with respect to the gear 11. The pins 7 are in reality crank pins and the throw effected by their operation is of course equal to twice the radius of the crank pins, said radius being the distance between the axes of the pins 7 and shafts 5.

Eccentric motion of the gear 11 produces very slow rotation of the gear 10 so as to drive the slow speed shaft 16. To each revolution of the gears 6, the gear 11 will be given an angular motion equal to the product of the teeth pitch and difference in the number of teeth in the two gears. The speed reduction accomplished will be that existing between the gears 9, 6, multiplied by that existing between the gears 10, 11, and the reduction ratio between the gears 10, 11, will be the number of teeth on the gear 11 divided by the difference between the number of teeth on the gears 10, and 11, and it is clear that this ratio can be made relatively great.

Turning of the shaft 16 operates the eccentrics in a manner well understood in the art to which this invention relates, so as to effect operation of the pumping jacks, not shown.

I claim:

In a pumping power, the combination of a base, a frame mounted above the base in spaced relation thereto, a vertical shaft journaled in the frame, a spur pinion on the shaft, means to turn the shaft, stub shafts on the frame, spur gears on the stub shafts in mesh with the pinion, an internal spur gear, eccentric driving connections between the first spur gears and said internal spur gear, a second vertical shaft journaled at one end in the base and at its other end in the frame, a spur gear on the second shaft positioned inside of and in mesh with the internal gear, eccentrics mounted on the second shaft between the frame and base, eccentric straps on the eccentrics, and cable-connection shackles secured to the straps.

Signed at Bakersfield, California, this 21st day of September 1921.

EDWIN O. BENNETT.

Witnesses:
A. B. McGee,
J. R. Hixon.